United States Patent [19]

Sheldon et al.

[11] Patent Number: 5,466,085
[45] Date of Patent: Nov. 14, 1995

US005466085A

[54] GIMBAL ASSEMBLY FOR SIX AXIS MACHINE TOOL

[75] Inventors: Paul C. Sheldon, Mequon; Edward E. Kirkham, Brookfield, both of Wis.

[73] Assignee: Giddings & Lewis, Inc., Fond du Lac, Wis.

[21] Appl. No.: 298,575

[22] Filed: Aug. 31, 1994

Related U.S. Application Data

[63] Continuation of Ser. No. 835,949, Feb. 20, 1992, Pat. No. 5,354,158, which is a continuation-in-part of Ser. No. 401,909, Sep. 1, 1989, Pat. No. 5,028,180.

[51] Int. Cl.$^6$ ............................. F16C 11/04; B23C 1/06
[52] U.S. Cl. ..................... 403/157; 403/150; 403/119; 403/53; 409/201
[58] Field of Search ........................ 409/201, 145, 409/216, 235; 901/22–23; 248/631, 654, 182; 408/234; 403/119, 53, 70, 71, 113, 116, 157, 158, 150, 79, 24, 52, 59, 112

[56] References Cited

U.S. PATENT DOCUMENTS

| Re. 27,051 | 2/1971 | Chappel . | |
|---|---|---|---|
| 1,008,048 | 11/1911 | Mueller et al. | 403/113 |
| 1,049,438 | 1/1913 | Augustine | 403/157 X |
| 2,037,208 | 4/1936 | Buckwalter | 403/158 |
| 2,399,043 | 4/1946 | Klumb | 403/157 X |
| 2,692,756 | 10/1954 | Lincoln | 403/53 X |
| 2,735,251 | 2/1956 | Dlugosch | 403/157 X |
| 2,823,591 | 2/1958 | Craddock et al. . | |
| 3,037,286 | 6/1962 | Bower . | |
| 3,547,458 | 12/1970 | Price | 403/157 X |
| 3,569,153 | 7/1971 | Brainard et al. . | |
| 3,577,659 | 5/1971 | Kail . | |
| 3,683,747 | 8/1972 | Petfit . | |
| 4,034,946 | 7/1977 | Zimmer, Jr. | 403/157 X |
| 4,280,285 | 7/1981 | Haas . | |
| 4,304,078 | 12/1981 | Meriwether, Jr. | 403/53 X |

(List continued on next page.)

FOREIGN PATENT DOCUMENTS

| 109201 | 5/1984 | European Pat. Off. . |
|---|---|---|
| 202206 | 11/1986 | European Pat. Off. . |
| 6935394 | 7/1971 | France . |
| 2540984 | 3/1977 | Germany . |
| 8301746 | 12/1987 | Germany . |
| 558788 | 7/1977 | U.S.S.R. . |
| 1049244 | 10/1983 | U.S.S.R. . |
| 1194672 | 11/1985 | U.S.S.R. . |
| 1224137 | 4/1986 | U.S.S.R. . |
| 1222538 | 4/1986 | U.S.S.R. . |
| 1296401 | 3/1987 | U.S.S.R. . |
| 2083795 | 3/1982 | United Kingdom . |
| 2173472 | 10/1986 | United Kingdom . |
| 2179605 | 3/1987 | United Kingdom . |
| WO91/103145 | 3/1991 | WIPO . |

OTHER PUBLICATIONS

"Milling With Universal Spindles", American Machinist, Jun., 1989.
"A Platform With Six Degrees of Freedom", D. Stewart, The Institute of Mechanical Engineers, Proceedings 1956–66, pp. 371–394.
"Universal Tyre Test Machine", V. E. Gough & S. G. Whiteall Proceedings, Ninth International Technical Congress F.I.S.I.T.A., Maye 1962, pp. 117–137.

*Primary Examiner*—Eric K. Nicholson
*Assistant Examiner*—Harry C. Kim
*Attorney, Agent, or Firm*—Foley & Lardner

[57] ABSTRACT

A pivotable joint usable, for instance, with a multi-legged machine tool, is disclosed. The basic design of the joint includes a central block to which is connected a first yoke pivotably mounted for motion about one axis. A second yoke is also pivotably mounted to the central block for motion about a second axis. The central block includes an opening extending therethrough between two surfaces, and the cross-sectional area of the opening decreases towards the central region of the block. This type of opening permits the use of an extensible mounting leg having a rod that moves through the opening during pivoting of the joint.

20 Claims, 12 Drawing Sheets

U.S. PATENT DOCUMENTS

| | | |
|---|---|---|
| 4,343,610 | 8/1982 | Chou . |
| 4,360,182 | 11/1982 | Titus . |
| 4,364,540 | 12/1982 | Montabet . |
| 4,368,997 | 1/1983 | Shemtov .............................. 403/119 X |
| 4,407,625 | 10/1983 | Shum . |
| 4,512,695 | 4/1985 | Brun et al. . |
| 4,536,690 | 8/1985 | Belsterling et al. . |
| 4,556,957 | 12/1985 | Ichikawa . |
| 4,569,627 | 2/1986 | Simunovic . |
| 4,576,577 | 3/1986 | Lam et al. . |
| 4,578,763 | 3/1986 | Jones et al. . |
| 4,621,926 | 11/1986 | Merry et al. . |
| 4,645,084 | 2/1987 | Deike . |
| 4,651,589 | 3/1987 | Lambert . |
| 4,723,460 | 2/1988 | Rosheim . |
| 4,753,596 | 6/1988 | Hart et al. . |
| 4,776,749 | 10/1988 | Wazzenbergt et al. . |
| 4,806,068 | 2/1989 | Kohli et al. . |
| 4,819,469 | 4/1989 | Shelef . |
| 4,988,244 | 1/1991 | Sheldon et al. . |
| 5,028,180 | 7/1991 | Sheldon et al. . |

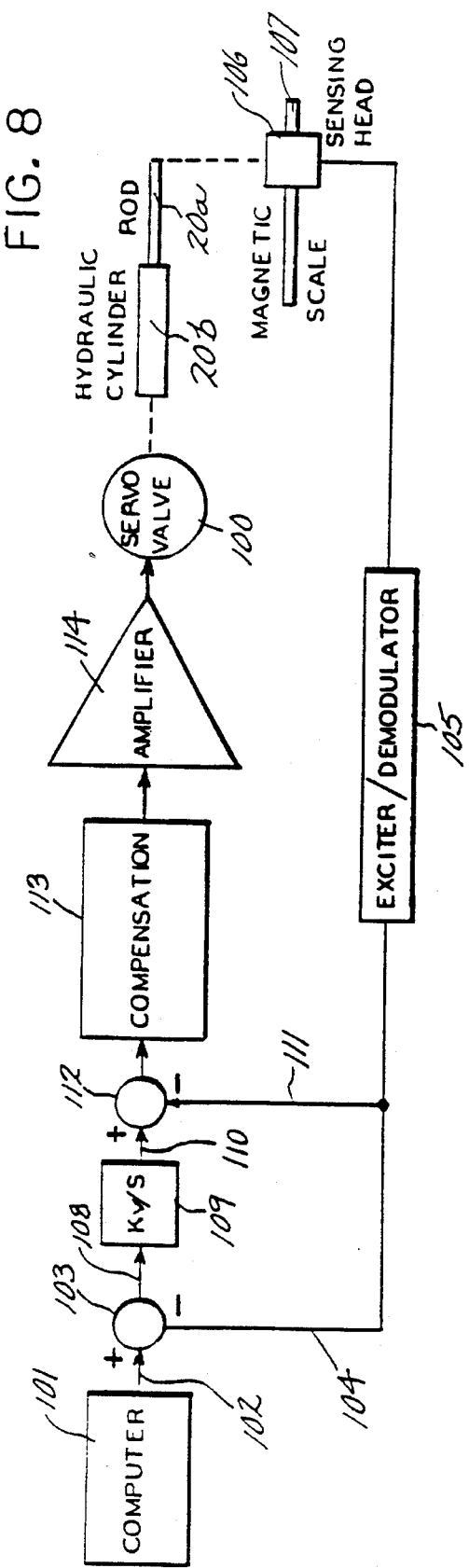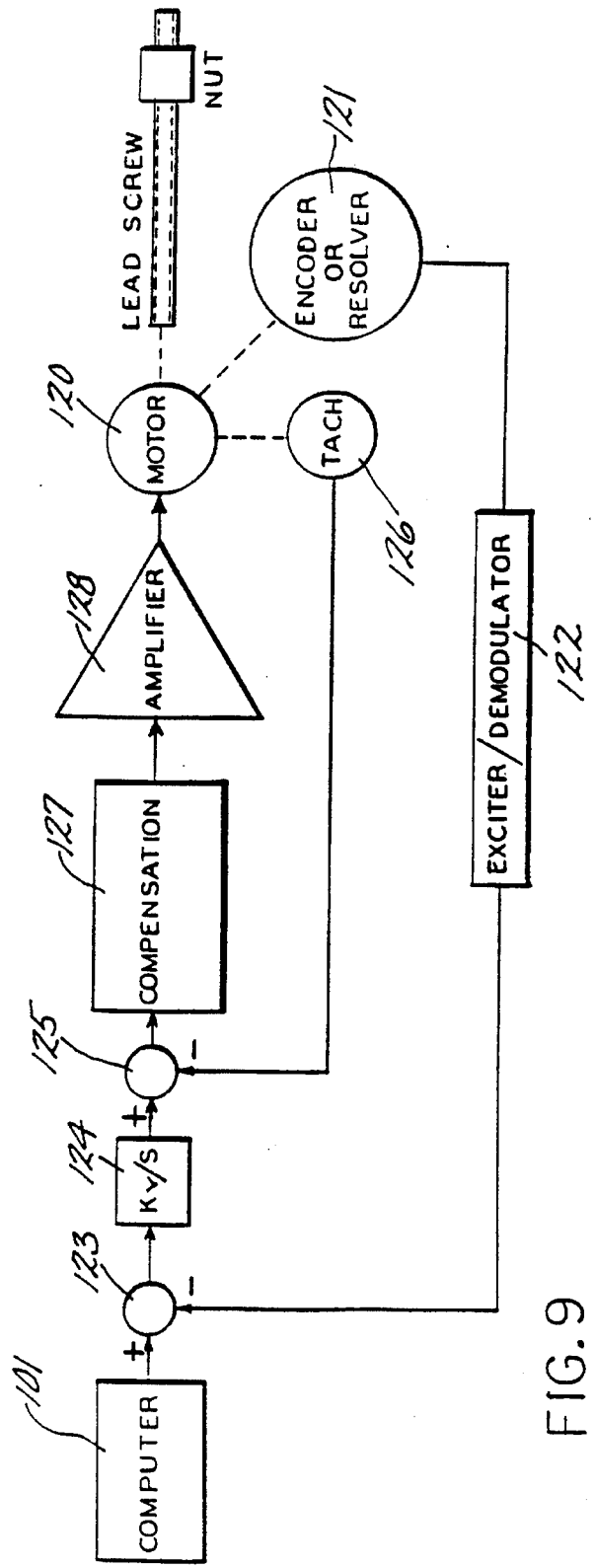
FIG. 8
FIG. 9

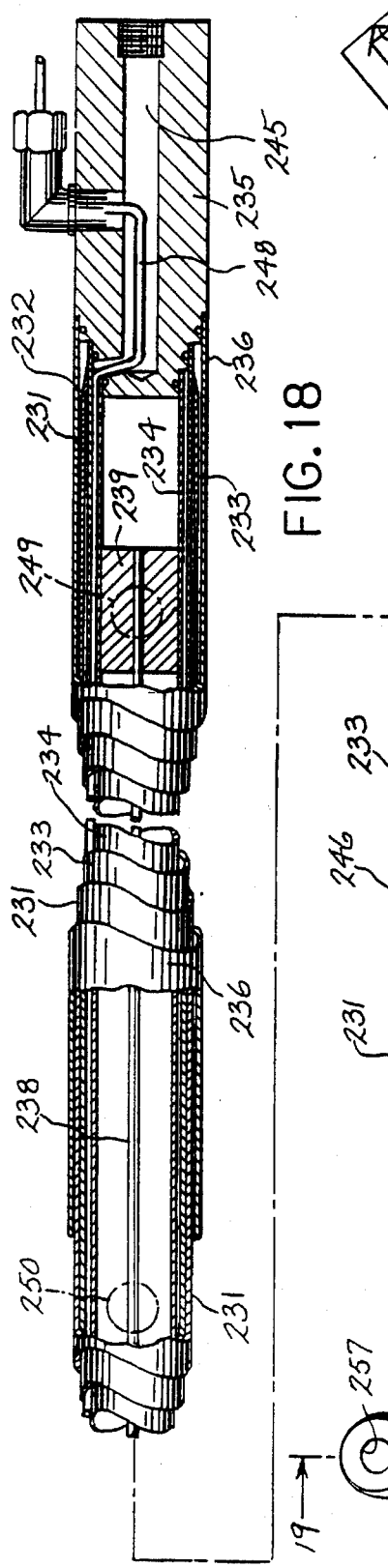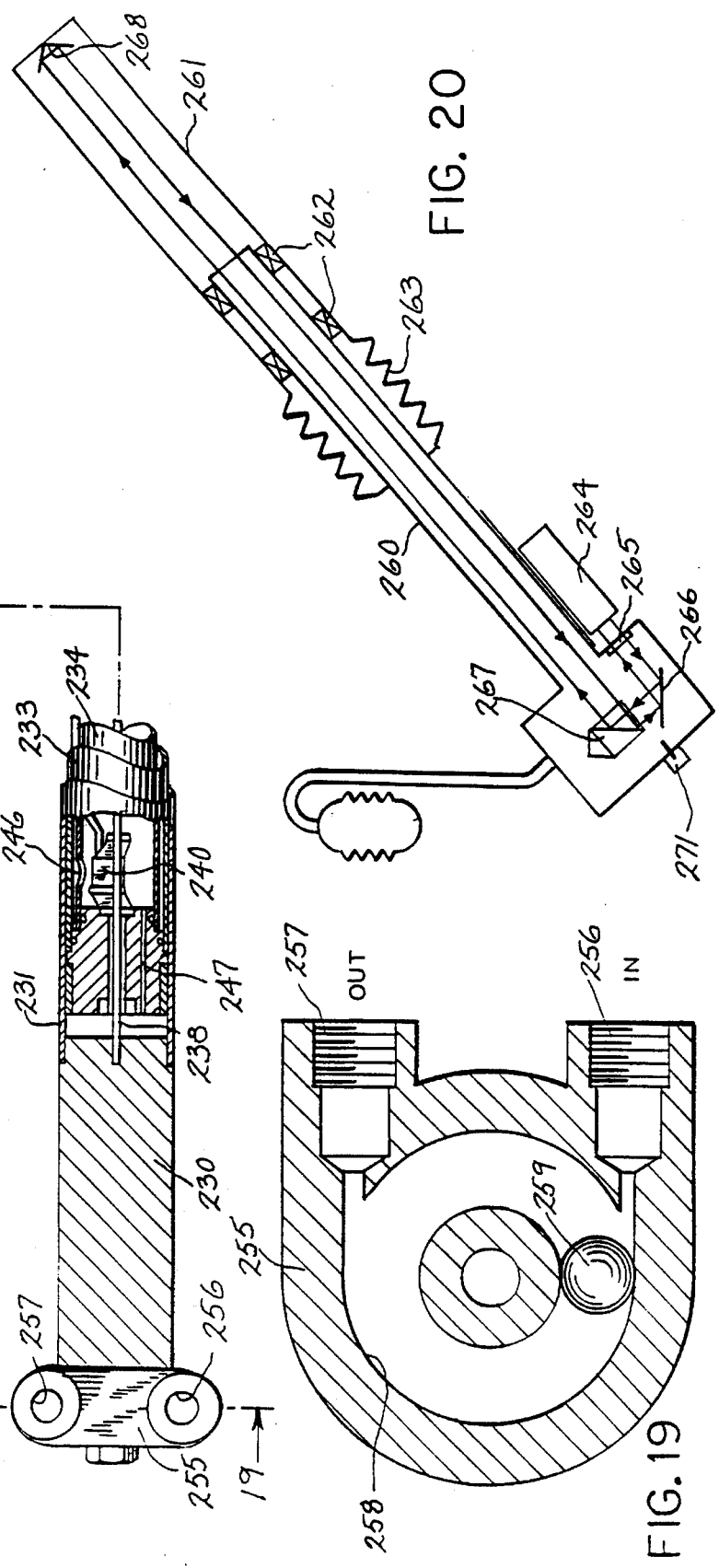
FIG. 18
FIG. 20
FIG. 19

GIMBAL ASSEMBLY FOR SIX AXIS MACHINE TOOL

This is a continuation of U.S. Patent application Ser. No. 07/835,949, filed on Feb. 20, 1992, now U.S. Pat. No. 5,354,158, which is a continuation-in-part of Ser. No. 07/401,909 now U.S. Pat. No. 5,028,180 filed on Sep. 1, 1989.

BACKGROUND OF THE INVENTION

This invention relates to a machine for locating an operator with respect to an object, and more particularly to a versatile machine tool in which the tool can be moved in three lineal directions and three rotational directions in relation to the surface of a workpiece.

The most versatile form of cutting tool type machine tool presently in use is the so-called machining center which typically can accomplish milling, drilling, boring and tapping operations in up to five axes of movement, the three linear orthagonal axes and two rotational directions. Since its introduction over thirty years ago, the machining center's basic components have not changed. They typically include a bed, an upright column and a spindle head carried by the column. A rotary table for holding a workpiece is typically mounted on the bed and provides one of the rotary directions of motion. The column and table move relative to each other for one of the linear directions of motion, the spindle head and table move relative to each other in a vertical direction for a second linear axis of motion, and the spindle head and workpiece move horizontally with respect to each other for the third linear direction of motion. The fifth axis is provided by rotating the spindle head or the work table in a vertical plane relative to each other.

A sixth axis of rotary motion is available in the present machining centers by controlling the angular position of the spindle. The present machining centers may have either a horizontal spindle or a vertical spindle and they typically are controlled by computer numerical control. The machining centers usually have mechanisms for automatically changing tools from and to a magazine of tools associated with the machining center, and will often have automatic workpiece handling as well.

To achieve the full six axes of motions in a present machining center requires that the movements of the table, column, spindle head, spindle, and bed be coordinated and that these sometimes massive components be moved in very controllable finite increments. Because all of these components are being moved, many times simultaneously under computer numerical control, accuracy requires a rigidity to the components and an accurate path through which the components can be moved. This has resulted in the development of more rigid and massive components such as for the bed and column and very expensive and finely formed ways along which the components can travel relative to each other in the linear directions.

Although the modern machining center provides very accurate machining, the machining center becomes very complex and expensive when it is designed to provide the maximum versatility of being able to machine any point on the exposed five surfaces of the typical cubic workpiece.

SUMMARY OF THE INVENTION

The present invention relates generally to a pivotable joint comprising a central block. A first yoke is pivotably connected to the central block for pivotable motion about a first axis. A second yoke is pivotably connected to the central block for pivotable motion about a second axis. The central block further includes an opening extending therethrough between a first surface and a second surface. The cross sectional area of the opening decreases from the first surface and the second surface towards a region located between the first surface and the second surface.

According to another embodiment of the invention, a joint assembly comprises an extensible member including a rigid outer housing and a rod configured to move therethrough. A mechanism is attached to the outer housing and the rod to move the outer housing with respect to the rod.

The joint assembly further includes a center member, which may be a center block, having a hole configured to receive the rod therethrough. A first mounting member is rigidly connected to the outer housing and pivotably connected to the center member for pivotable motion about a first axis. Additionally, a second mounting member is pivotably connected to the center member for pivotable motion about a second axis. The hole is configured to allow pivotable motion of the rod about the first axis while the center member remains rotationally stationary with respect to the first axis.

BRIEF DESCRIPTION OF THE DRAWINGS

FIG. 8 is a schematic view of a control for a machine tool in accordance with the invention;

FIG. 9 is a schematic diagram of a second embodiment of a control;

FIG. 18 is a foreshortened view in longitudinal cross-section of an instrument arm usable with the machine tools;

FIG. 19 is a view in section of one end of the instrument arm of FIG. 18 and taken in the plane 19—19 in FIG. 18;

FIG. 20 is a schematic view of an instrument arm using a laser interferometer for measuring distances.

DETAILED DESCRIPTION OF THE PREFERRED EMBODIMENTS

Figure 2:
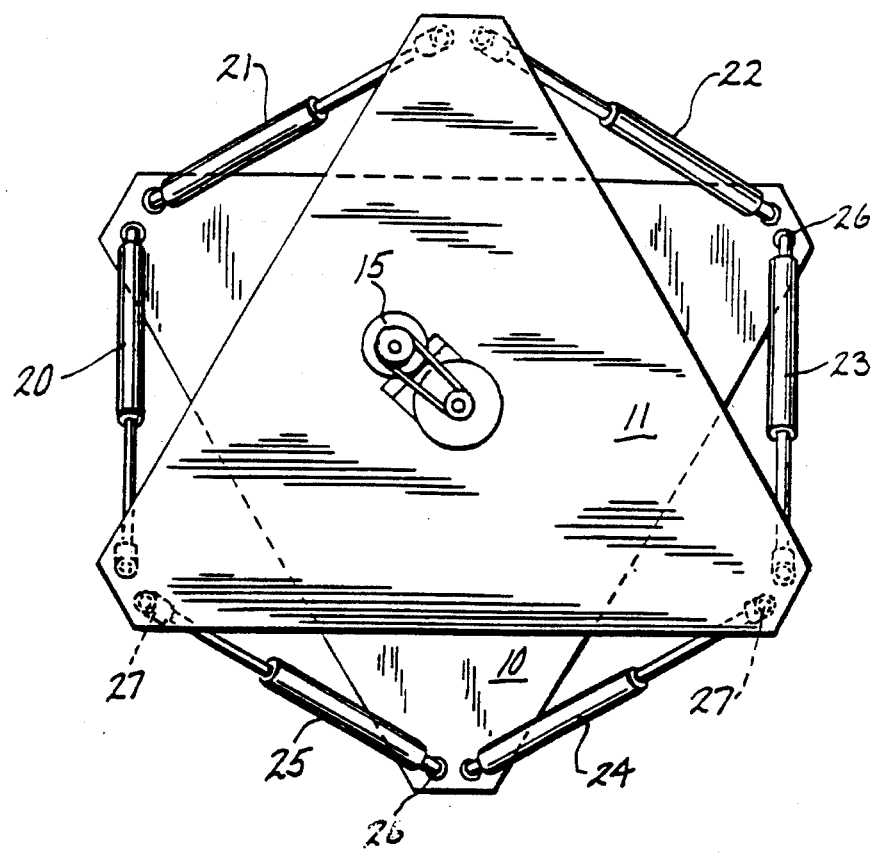
FIG. 2 is a top plan view of the machine tool of FIG. 1.
Figure 1:
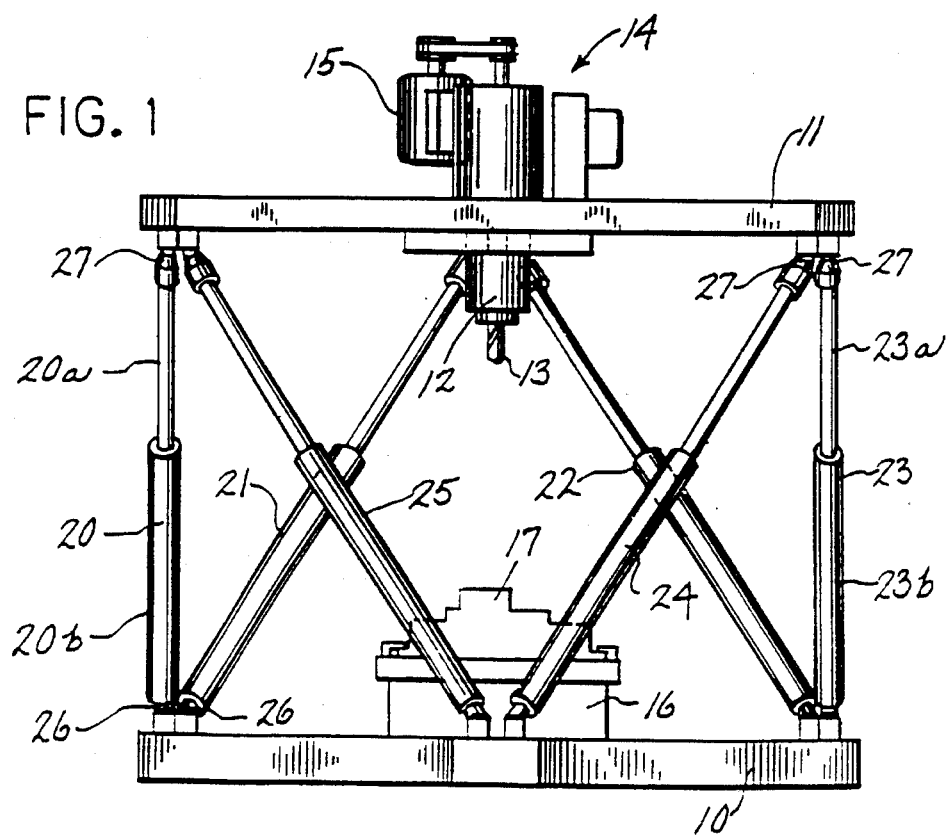
FIG. 1 is a view in elevation of a machine tool in accordance with the invention.

Referring to FIGS. 1 and 2, the machine tool of the first embodiment has a base 10 in the nature of a support or platform and a spindle support or platform 11 spaced from the base 10. A spindle head 12 is mounted on the spindle platform 11 and is adapted to receive a rotating cutting tool 13. A spindle drive assembly indicated generally by the numeral 14 is mounted on the spindle platform 11 and the drive includes a motor 15 connected by a power train to the spindle head 12 in a usual manner. The base platform 10 carries a workpiece support 16 which in turn receives a workpiece represented by the part 17.

The spaced platforms 10 and 11 are joined together by six powered and extensible legs 20–25. Each of the legs is pivotally mounted at its lower extremity to the base platform 10 by a ball and socket joint 26. Similarly, each of the upper ends of the legs 20–25 is pivotally attached to the spindle platform 11 by a second ball and socket joint 27.

The legs 20–25 may be formed of telescoping upper and lower parts 20a and 20b, for example. The telescoping parts may be the piston rod 20a and cylinder 20b of a hydraulic cylinder. The length of such legs can be adjusted by controlling the volume of hydraulic fluid in each end of each cylinder.

The position of the spindle support 11 relative to the base support 10 and therefore the position of the cutting tool 13 relative to the workpiece 17 can be adjusted by simultaneously manipulating the length of each of the six legs 20–25. Within an envelope of motion the cutting tool 13 can be applied against all five exposed surfaces of a cubic type workpiece. The only constraints to the envelope of motion relative to the five exposed surfaces are the spread of the joints 26 on the base support 10 and the spread of the second joints 27 on the spindle support 11, the minimum and maximum length of the legs 20–25, the total range of linear motion of each of the legs, and the need to avoid placing certain legs in a common plane for purposes of stability. Within the envelope of motion, this construction allows the machining of contours in three dimensions as well as straight line point-to-point machining.

The simultaneous manipulation of the length of each of the legs 20–25 can achieve motion in all six axes. That is, motion in a linear direction along each of the three orthogonal axes and rotary motion about each of those three axes.

In the embodiment of FIGS. 1 and 2, the six legs may be considered to be arranged in three pairs. That is, the legs 20 and 21 constitute a pair, the legs 22 and 23 constitute a second pair, and the legs 24 and 25 constitute a third pair. It should be noted that the legs of each pair are arranged so that they are at an angle with respect to each other. The joints 26 of the pair of legs 20 and 21 are close to each other. The joints 27 of adjacent legs 20 and 25, for example, are also close to each other. The effect is that the lower joints 26 generally define a triangle and the upper joints 27 also generally define a triangle. These two triangles and the six legs generally define edges of an octahedron. As shown in FIGS. 1 and 2, the area of the base platform 10 circumscribed by the lower ball joints 26 and the area of the spindle support 11 circumscribed by the upper ball joints 27 are substantially the same. This is advantageous for several reasons. First, such an arrangement maximizes the structural stiffness of the machine. Secondly, the footprint of the machine is minimized for a particular cubic size of workpiece to be handled. Also, a greater envelope of surface area for the workpiece can be accommodated before certain legs and supports are positioned in a common plane thereby creating a potentially ambiguous position.

Figure 3:
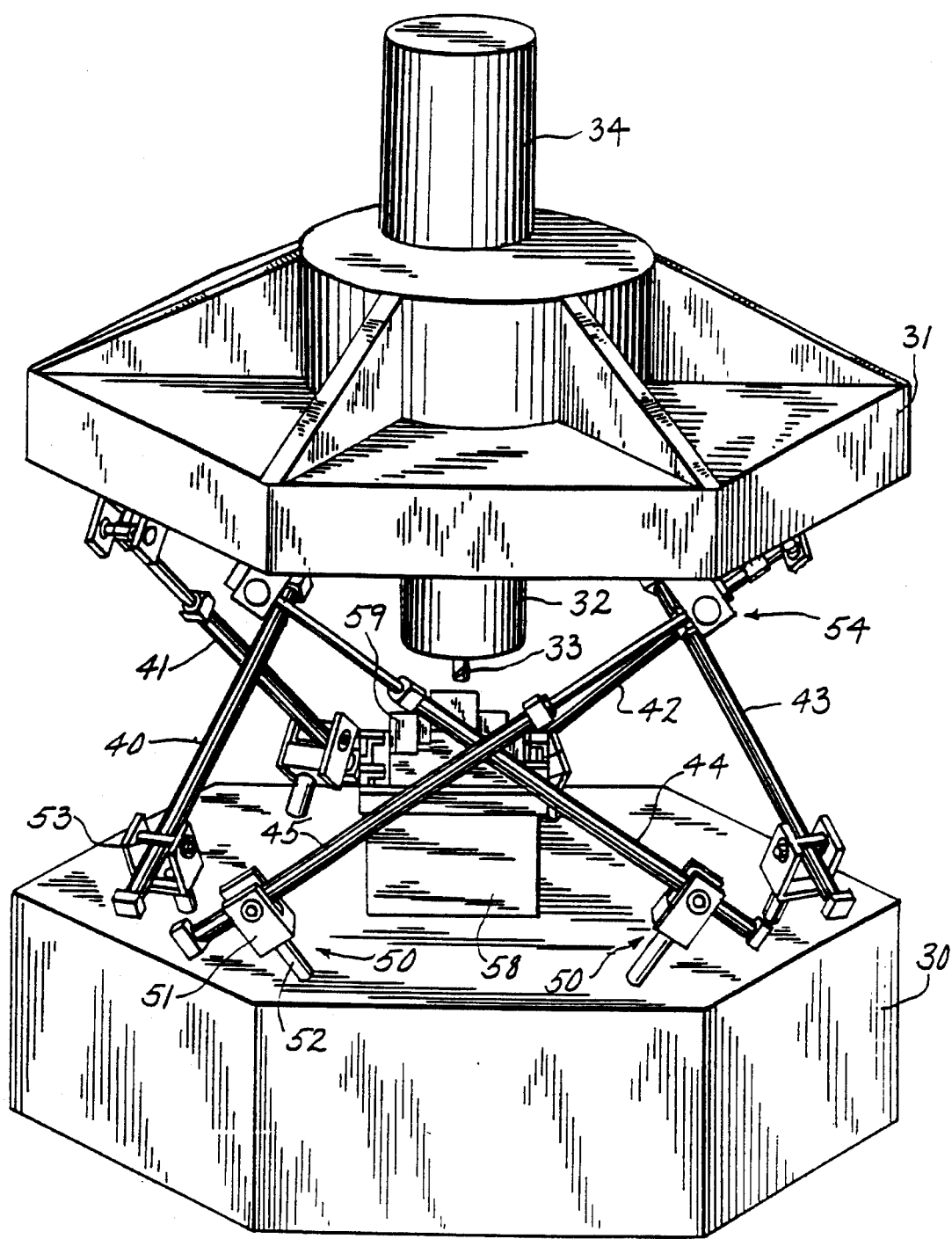
FIG. 3 is a view in perspective of a second embodiment of a machine tool in accordance with the present invention.
Figure 4:
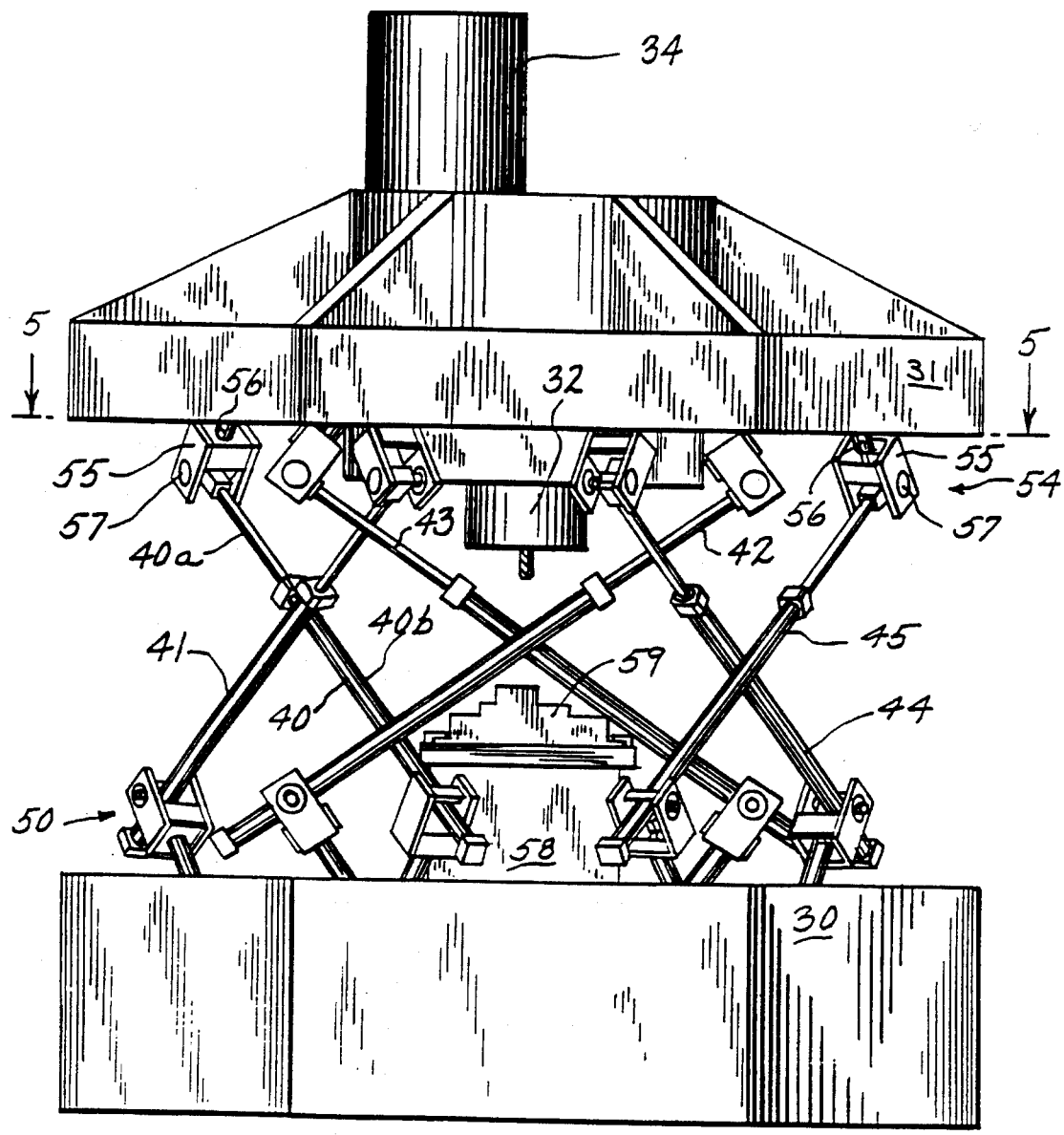
FIG. 4 is a view in elevation of the machine tool of FIG. 3.
Figure 5:
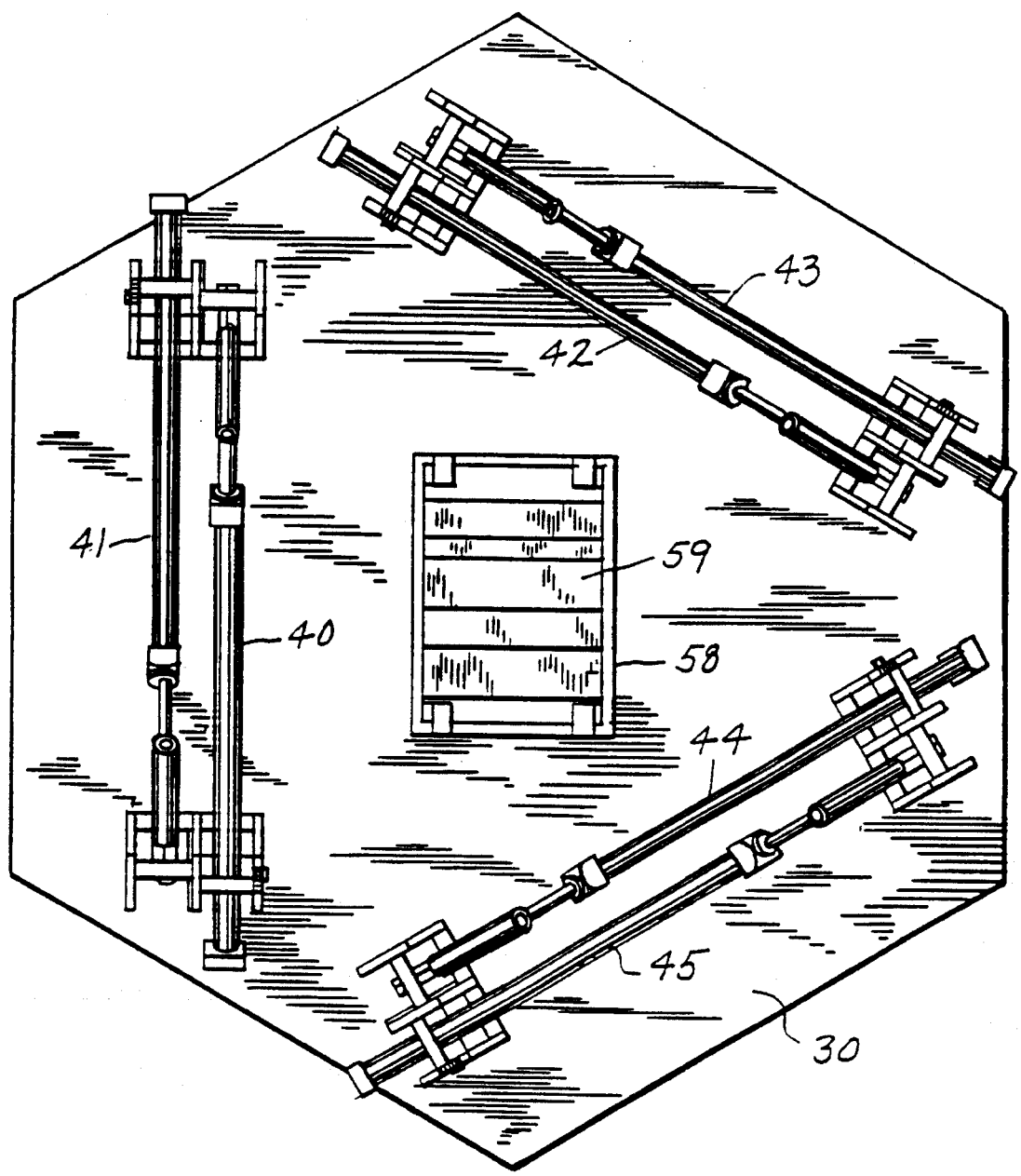
FIG. 5 is a top view of the machine tool of FIGS. 3 and 4 as viewed through the section of the plane 5—5 of FIG. 4.

Referring to FIGS. 3–5, the second embodiment includes a base support or platform 30, a spindle support 31 which mounts a spindle head 32 adapted to receive a cutting tool 33. The spindle head is rotated by a spindle drive 34. The base support 30 and spindle support 31 are connected by six extensible legs 40–45. The legs are arranged in three pairs such as the pair 40 and 41 and legs of each pair cross each other so that they are again mounted at an angle with respect to each other. The legs 40–45 are also formed of telescoping upper and lower elements 40a and 40b, for example.

The legs 40–45 are joined to the base support 30 at a first point near their lower end by a joint indicated generally by the numeral 50. The joint 50 includes a clevis 51 mounted for rotation about the axis of a shaft 52 that projects from the base support 30. A typical trunnion 53 engages the lower element 40b–45b of each leg and is rotatably mounted in a clevis 51. It will thus be seen that a joint 50 provides two degrees of freedom of movement.

The upper telescoping portions 40a–45a of the legs are similarly joined to the spindle support 31 at second points along the length of the legs by joints 54. The joints 54 likewise consist of a clevis 55 rotatably mounted on a shaft 56 extending downwardly from the underside of the spindle support 31 and a trunnion 57 which supports the upper leg portions 40a et seq. in the clevis 55. As can be seen in FIG. 5 in particular, the joints 50 and 54 and their attachments to the supports 30 and 31 define the corners of a six-sided polygon in each of the two supports. As is apparent from FIGS. 3–5, the area of the base support 30 that is circumscribed by the connections of six lower joints 50 with the base support 30 is substantially the same as the area of the spindle support 31 that is circumscribed by the connections of the six upper joints 54 with the spindle support 31.

The shafts 52 and 56 of the joints 50 and 54 can be mounted in their respective supports to project in any direction. The ball joints of the first embodiment could also be used in this second embodiment, and the trunnion joints of this second embodiment could be used in the first.

The base support 30 mounts a workpiece support 58 which holds a workpiece exemplified by the part 59.

The legs 40–45 may also be formed as hydraulic cylinders with the piston rod defining the upper end 40a et seq. and the cylinder portion forming the lower ends 40b et seq. Because the piston rod can rotate within the cylinder, the two degrees of motion afforded at each of the joints 50 and 54 are sufficient. If the upper and lower portions of the actuators forming the legs cannot be allowed to twist, an actuator other than a hydraulic cylinder is used to accomplish the extension, and a third degree of rotational motion will be required in one or the other of the upper and lower joints 50 and 54. In the leg of FIGS. 14–17, an additional degree of motion is required in the joints or compensation must be provided for the linear inaccuracy resulting from relative rotation of the telescoping parts introduced by slight angular displacement of the yoke assemblies relative to each other.

Instead of using hydraulic cylinders as the actuators for the legs, any means for achieving linear motion can be used such as forming the upper portion of each leg as a lead screw and mounting a rotating nut in the lower portion of the leg or vice versa. Alternatives are linear motors, recirculating ball screw drives, chain drives, and so forth.

Figure 6:
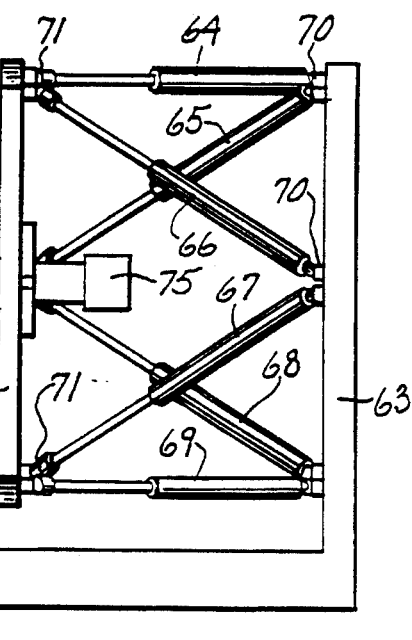
FIG. 6 is a view in elevation of a third embodiment of a machine tool in accordance with the invention.

In the third embodiment of FIG. 6, neither the tool nor the workpiece is located within the envelope defined by the leg structure. The workpiece 60 is mounted on a workpiece support 61 which in turn is mounted on a base 62 that is attached to an upright 63. The six legs 64–69 are connected at one end to the upright 63 by trunnion joints 70 in a manner similar to that of the second embodiment. The opposite ends of the legs 64–69 are connected by trunnion joints 71 to the spindle support 72. The spindle support carries a spindle 73 adapted to mount a tool 74 and the spindle 73 is driven by a spindle drive 75. The tool 74 projects away from the envelope defined by the legs 64–69. The third embodiment is otherwise the same as the first embodiment.

In the third embodiment, the workpiece support 61 may be mounted on ways supported by the base 62 so that the workpiece support 61 with the workpiece 60 may move relative to the tool 74. Even though the workpiece 60 is not mounted on the upright 63, the workpiece location relative to the upright support 63 can be fixed, or at least known, at any instant in time.

Other arrangements of spindle and workpiece can also be employed, such as mounting the workpiece above the spindle or mounting an upright 63 as in the third embodiment of FIG. 6 on ways so that it can travel along the length of a workpiece.

The legs must be moved in a coordinated manner in order to position the supports or platforms relative to each other. The coordinated movement is preferably accomplished by a computer control which provides a position signal for each leg to achieve a desired position for the spindle platform relative to the base platform and therefore for the cutting tool relative to the workpiece. Suitable control schemes are illustrated in FIGS. 8 and 9. In FIG. 8, the leg in the form of a hydraulic cylinder such as the legs 20–25 are controlled by a servo valve 100 which controls the volume of hydraulic fluid in the cylinder on each side of the piston and therefore the position of the piston rod within the cylinder. A computer 101 produces an output position command in the line 102. That position command is compared in a summing circuit 103 with a feedback position signal in a line 104 leading from an exciter/demodulator 105 that receives the signal from a sensing head 106 traveling along a magnetic scale 107. The sensing head 106 is coupled to the piston rod 20a et seq. so that changes in position of the piston rod will be reflected in changes in position of the sensing head 106 along the magnetic scale 107 which is at a known position, either fixed or varying, with respect to the hydraulic cylinder 20b et seq. The summing circuit 103 produces a position error signal in a line 108 which inputs to an integration network 109, the output of which is a velocity command in a line 110. The velocity command is compared with a velocity feedback signal in a line 111 leading from the exciter/demodulator 105 and the two signals are fed to a summing circuit 112 which produces an output signal representative of a velocity error. This velocity error signal is fed to a compensation network 113 where phase shift compensation takes place, and the resulting compensated signal is fed to an amplifier 114 which in turn controls the servo valve 100.

A similar control loop leading from the computer would be provided for each of the six legs 20–25 and the computer 101 would generate an output position command for the desired position of each of the six legs to achieve a particular finite position of the cutting tool relative to the workpiece.

The control arrangement of FIG. 9 is similar to that of FIG. 8 but is shown in relation to a motor 120 rotating a lead screw and nut arrangement. An encoder or resolver 121 is connected to the motor 120 to provide a position feedback signal through the exciter/demodulator 122, and that position signal is compared at a summing junction 123 with the position command from the computer 61 to produce a position error signal fed to the integration network 124 which outputs a velocity command compared at a summing junction 125 with the velocity position signal from a tachometer 126 connected to the motor 120. A compensation network 127 functions to produce an appropriate signal to an amplifier 128 connected to the motor drive. Once again, there would be a similar loop for each of the six legs of the machine.

Figure 10:
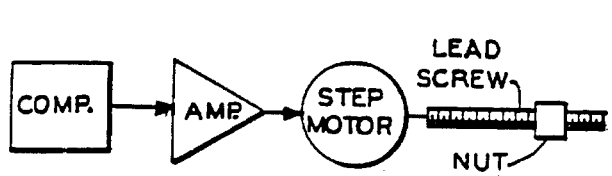
FIG. 10 is a schematic diagram of a third embodiment of a control.

The control schemes of FIGS. 8 and 9 employ closed loop control. However, by using a stepping motor it is not necessary to have a closed loop control. An example of a control system using a stepping motor is shown in FIG. 10.

Position signals can be provided by sensors that are directly connected to each of the legs or to the actuators for the legs. However, a more accurate approach uses separate instrument arms. Such an arrangement is shown in FIG. 7.

Figure 7:
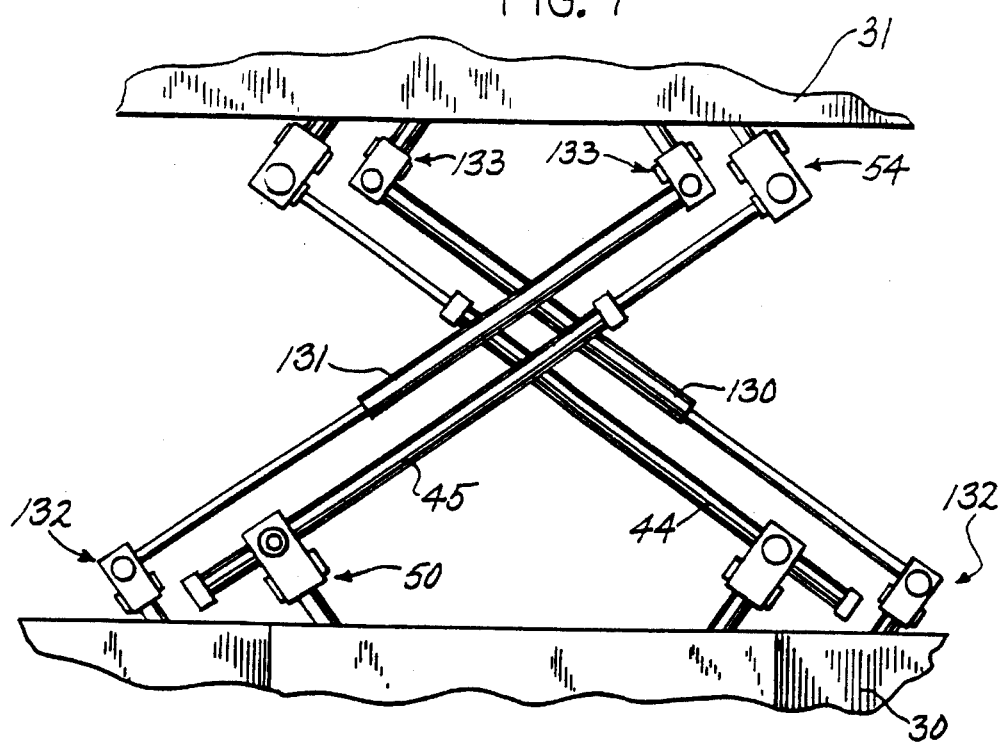
FIG. 7 is a partial view in elevation of a leg and instrument arm arrangement usable with any of the embodiments.

In FIG. 7, a six legged machine tool of the embodiment shown in FIGS. 3–6 has separate instrument arms 130 and 131 associated with respective powered legs 44 and 45, respectively. The instrument arms 130 and 131 are each linearly extensible and are connected at their lower ends to the base platform 30 by trunnion joints 132 and at their upper ends to the spindle platform 31 by trunnion joints 133. The trunnion joints 132 and 133 are the same in structure and operation as the joints 50 and 54 used to connect power legs 44 and 45 to the platforms 30 and 31.

The instrument arms 130 and 131 are used solely for the purpose of sensing the relative positions of the platforms. The instrument arms can include a sensing head traveling along a magnetic scale to provide the desired feedback signal as to length and therefore as to position. Other forms of instrument arms can also be used. The advantage in using the separate instrument arms is that the load deflections that will occur in the power legs and their joints will not be translated into errors in the position of the cutting tool. The instrument arms being smaller and lighter and carrying no weight other than their own, are not subject to the same forces and deflections to which the powered legs are subject.

Although the instrument arms 130 and 131 are shown mounted parallel with respective power legs, it is not necessary for the instrument arms to be so mounted. Instrument arms are not required to be associated with any particular power leg. It is, however, necessary to have at least six instrument arms to provide an unambiguous set of signals for the positions of the supports or platforms relative to each other.

Figure 11:
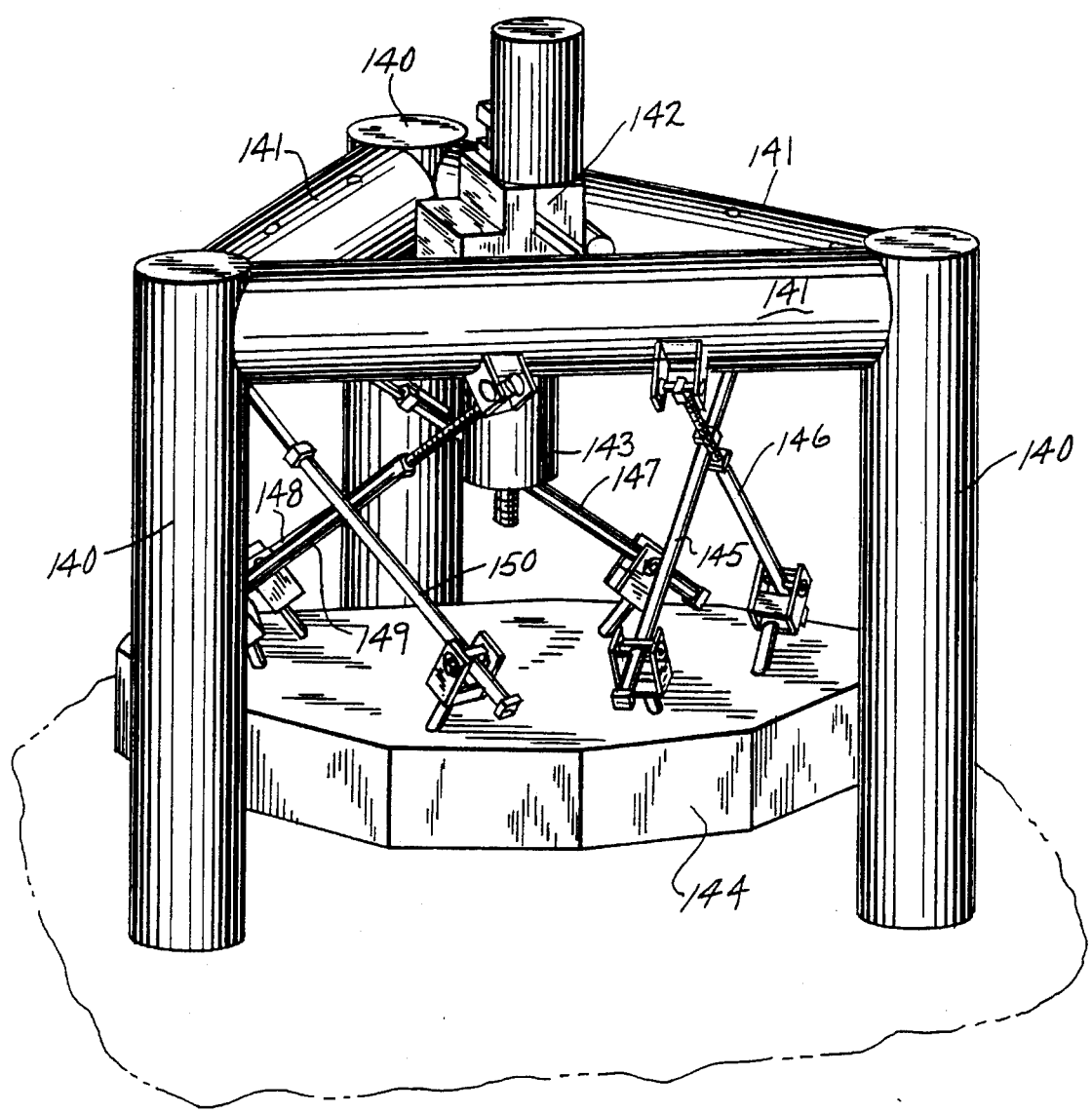
FIG. 11 is a view in perspective of a fourth embodiment of a machine tool in accordance with the invention.

In the fourth embodiment of FIG. 11, one of the platforms is elevated and the second platform is suspended from the first platform on the six legs. Specifically, a support structure is formed from three upright columns 140 joined together by a triangular framework of members 141. A spindle housing 142 is supported on the triangular framework of members 141 with a spindle 143 pointing downwardly towards a workpiece platform 144. The workpiece platform 144 is suspended on six extensible powered legs 145–150 which are arranged in pairs of crossing legs, similar to the arrangement of the legs 40–45 in the second embodiment of FIGS. 3, 4 and 5. The workpiece platform 144 may mount a pallet with a workpiece (not shown) in the usual manner. The legs 145–150 are pivotally joined at their upper ends to the members 141 and at their lower ends to the workpiece platform 144 in a manner similar to that of the second embodiment.

One advantage of suspending a platform on the six legs is that in case of a gross power failure which could cause the power legs to lose their ability to support a platform, the work platform 144 would move away from the spindle. This would result in no damage to either the spindle, the tool, or the workpiece because there would be no collision between the parts. In contrast, in an arrangement as shown in the first and second embodiments, a gross power failure in which the power legs lose their ability to support a platform could result in the spindle crashing into the workpiece or workpiece support.

Instead of the workpiece platform being suspended beneath the spindle platform, the workpiece platform could be above a suspended spindle platform. Then, chips would naturally fall away from the workpiece.

Figure 12:
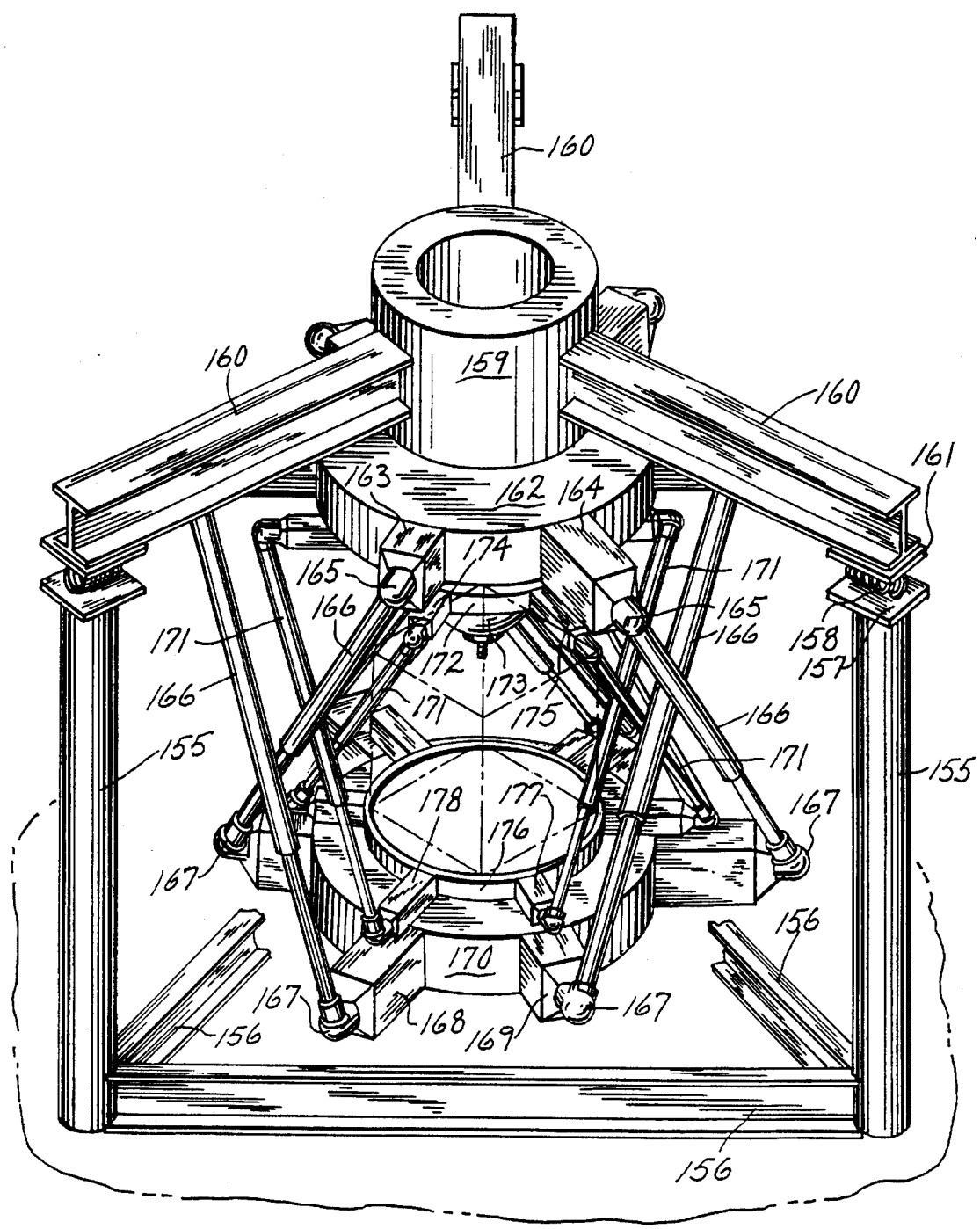
FIG. 12 is a view in perspective of a fifth embodiment of a machine tool in accordance with the invention.

The fifth embodiment of FIG. 12 also suspends a workpiece platform from a support. In addition, it provides an instrument arm associated with each of the six power legs and a spoke-like system of connections of the ends of the powered legs and instrument arms to the platform and support.

Specifically, the fifth embodiment of FIG. 12 has three upright columns 155 joined at their base by three I-beams 156 (two of the beams are shown foreshortened for clarity). The top of each column 155 carries a bearing plate 157 on which a vibration isolation member such as a coil spring 158 rests. A spindle housing 159 has three radiating support arms 160 in the form of I-beams. The outer ends of the support arms 160 each mounts a bearing plate 161 which rest upon a respective isolation member 158.

The spindle head 159 is mounted on top a ring platform 162 from which two series of spokes 163 and 164 project. The spokes 163 and 164 are of two lengths that alternate around the ring platform 162 and the spokes mount the universal joints 165 that connect the upper ends of six powered legs 166 to the platform 162. The lower ends of the powered legs 166 are connected to universal joints 167 mounted at the ends of spokes 168 and 169 which project radially from a ring-like work platform 170. The spokes 163, 164 and 168, 169 are of different lengths to accommodate the overlapping and crossing arrangement of the powered legs 166, which is similar to that in the second and fourth embodiments.

A similar arrangement of rings and spokes is used to mount universal joints at the ends of six instrument arms 171. That is, a second ring structure 172 is disposed beneath the ring support 162 at the spindle end and about the spindle 173. A series of radially projecting spokes 174 and 175 of two different lengths project from the ring 172. The bottom workpiece platform 170 contains a second ring 176 from which two series of spokes 177 and 178 project to mount the universal joints at the bottom ends of the instrument arms 171. The instrument arms 171 are arranged in pairs of crossing arms in the same manner as the powered legs 166.

The use of spokes emanating from the platform allows the powered legs and instrument arms to be removed from close proximity to the central axis of the spindle head and workpiece support with the result that it is easier to load a workpiece onto the workpiece platform. This is illustrated in FIG. 12 in which a phantom line identifies a cubic workpiece which could be accepted by the machine tool and it may be noted that there is an opening through the powered legs 166 and instrument arms 171 to accommodate the insertion and removal of a workpiece of that size.

The ring structure 172 and the ring 176 can be structurally independent from the ring platform 162 and the work platform 170, the instrument arms 171 can be structurally isolated from the deflections of the platforms induced by the powered legs 166.

Figure 13:
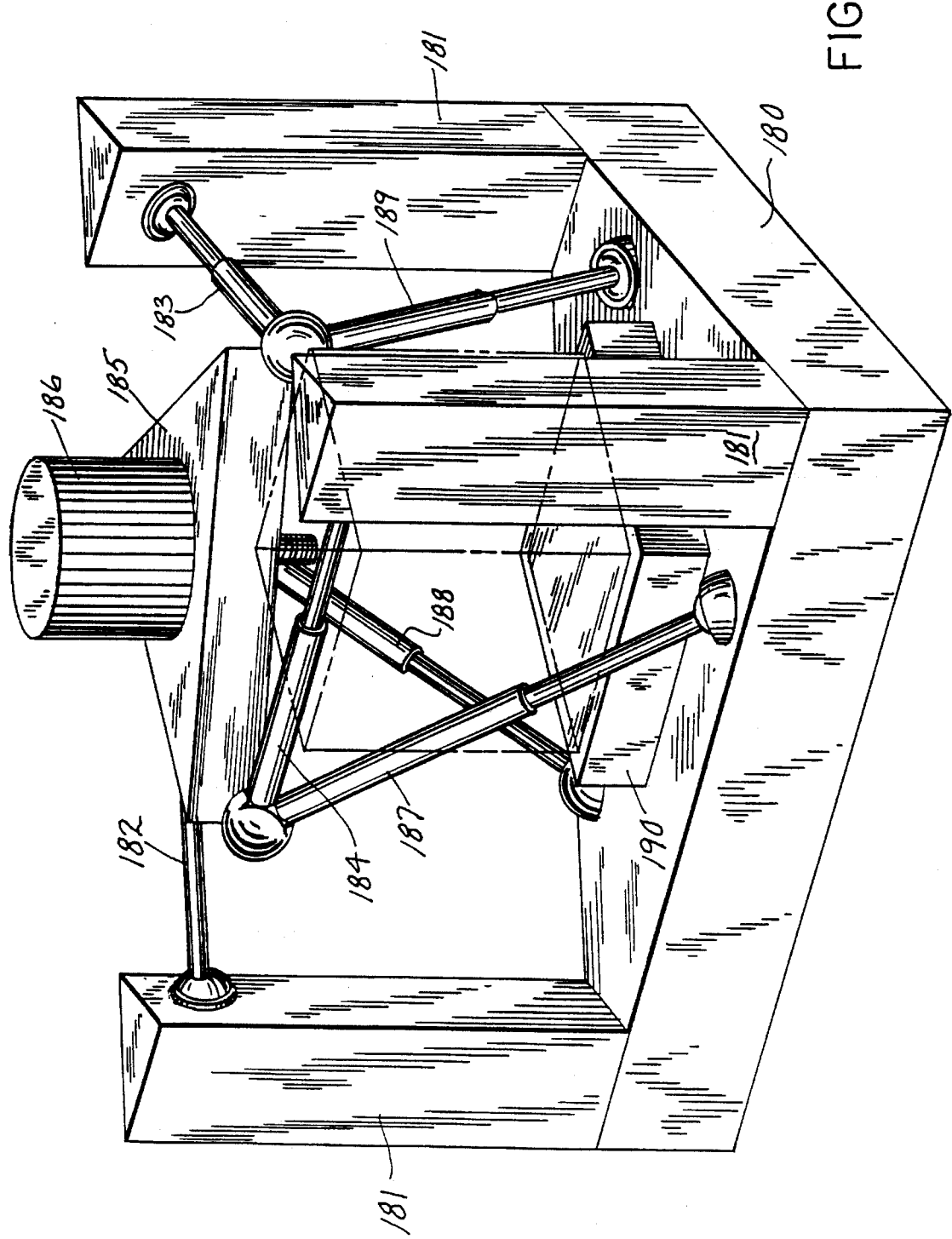
FIG. 13 is a view in perspective of a sixth embodiment of a machine tool in accordance with the invention.

The sixth embodiment of FIG. 13 arranges three of the six legs in a different attitude than that of the prior embodiments. Specifically, three of the legs are mounted in or near a common plane that includes the upper platform. As shown in FIG. 13, a base 180 of generally triangular shape mounts triangular columns 181 at each of its corners. Three powered legs 182, 183 and 184 extend from universal joints disposed near the upper end of each of the columns 181. The other ends of the three legs 182, 183 and 184 are mounted in universal joints at the corners of a triangular spindle platform 185 which mounts a spindle head 186. The remaining three powered legs 187, 188 and 189 extend from universal joints in the base 180 upward to the three corners of the triangular spindle platform 185. A workpiece platform 190 rests on the base 180 within the envelope of the three lower legs 187, 188 and 189.

The embodiment of FIG. 13 functions in the same manner as the other embodiments and demonstrates that it is not necessary for the legs to extend between two planes, so long as the legs extend between the two platforms. The six legs in the embodiment of FIG. 13 extend from the workpiece platform represented by the base 180 and its columns 181, and to the spindle platform 185.

FIGS. 14–17 illustrate a ball screw driven powered leg usable with the machines of the present invention. Generally, a rotatable ball screw rod 195 is mounted with a stationary platform yoke assembly indicated generally by the reference numeral 196. A nut tube 197 surrounds and is operatively connected to the ball screw rod by a plurality of recirculating bails 197'. The nut tube 197 is connected to a movable platform yoke assembly indicated generally by the numeral 198. The yoke assemblies 196 and 198 are connected to the stationary and movable platforms of the machine tool, respectively. The ball screw rod 195 is rotated by a hydraulic or electric motor 199 mounted on a bracket 200 connected to the stationary yoke assembly 196. The motor has an output shaft 201 connected to the ball screw rod 195 by a toothed belt 202 operating between pulleys connectively to the output shaft 201 and the ball screw rod 195. The ball screw rod 195 is journaled in a pair of thrust bearings 203 mounted in a cage associated with a motor fork 204 that forms part of the stationary platform yoke assembly 196. A bellows 205 is connected at one end to the nut tube 197 and at the other end to a tube 206 which, in turn, is connected to the motor fork 204.

As the ball screw rod 195 is rotated by the motor 199, the nut tube 197 will move along the length of the rod 195 in a direction dependent upon the direction of rotation of the rod 195. The effect will be to reduce or extend the distance between the yoke assemblies 196 and 198 thereby varying the effective length of the leg.

Figure 16:
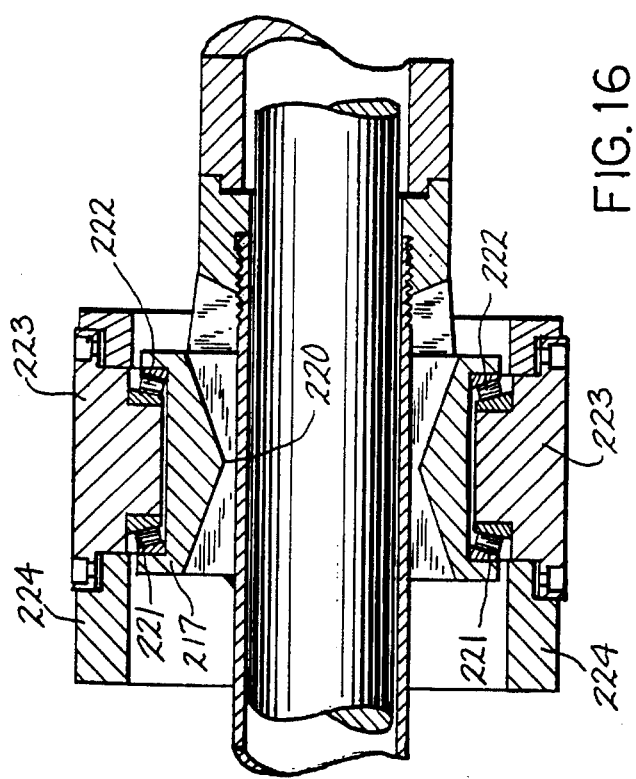
FIG. 16 is a view in longitudinal cross section through the yoke assembly of FIG. 15 and taken in the plane of the line 16—16 in FIG. 14.
Figure 15:
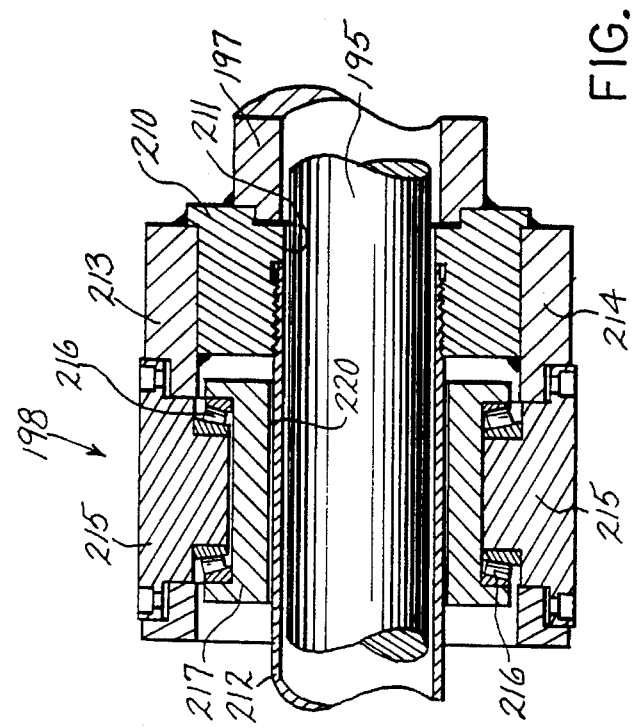
FIG. 15 is a partial view in longitudinal cross section, to an enlarged scale, of one of the yoke assemblies for connecting the powered leg to a platform or support.
Figure 17:
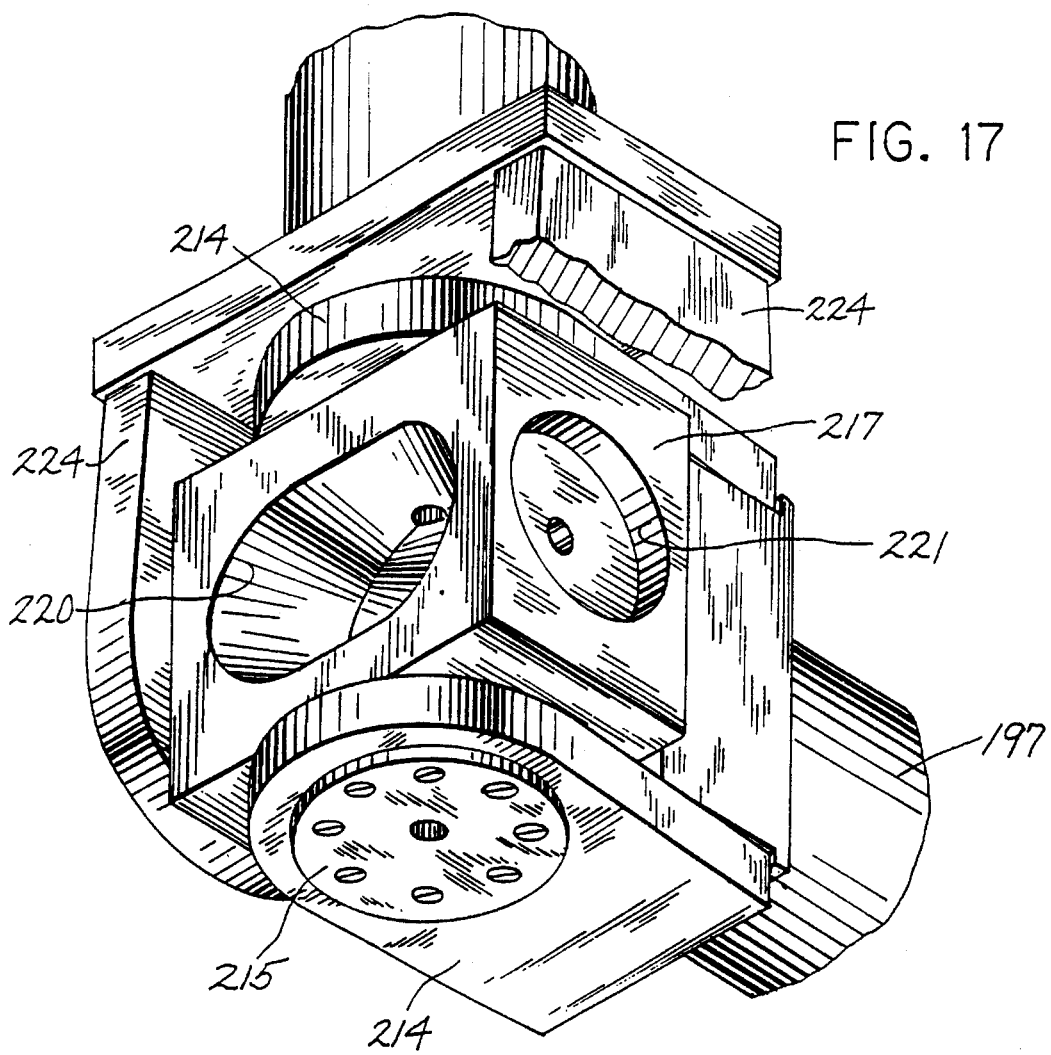
FIG. 17 is a view in perspective of the yoke assembly of FIGS. 15 and 16.

Referring specifically to FIGS. 15–17, the movable platform yoke assembly 198 includes a U-shaped fork 210 which is connected to the nut tube 197 and which has a central opening 211 through which the screw rod 195 passes.

A protective tube 212 extends from the fork 210 along the outside of the screw rod 195. The side arms 213 and 214 of the fork 210 mount bearing holders 215 that hold the inner race of thrust bearings 216 which are received in recesses in opposite side faces of a block 217. The block 217 has a central opening 220 which is flared from the mid-point of the opening towards the opposite ends of the block 217, as shown in FIG. 16. The remaining two side faces of the block 217 have bearing recesses 221 which receive thrust bearings 222 held in place by a bearing retainers 223. The bearing retainers 223 are mounted in spaced arms 224 of a second fork attached to the movable platform. By reason of the construction, the two forks are disposed at 90° from each other.

As will be appreciated, the yoke assembly 198 allows rotary motion about an axis through the bearings 222 and rotary motion about an axis through the bearings 216. The flared shape of the opening 220 accommodates the latter rotary motion. The construction and operation of the fixed platform yoke assembly 196 is the same as that described for the movable platform yoke assembly 198.

Mounting the yoke assemblies at points along the length of the powered leg, rather than at the ends, results in a significant increase in the ratio of the maximum to minimum distance between the yoke assemblies as the leg moves.

Figure 14:
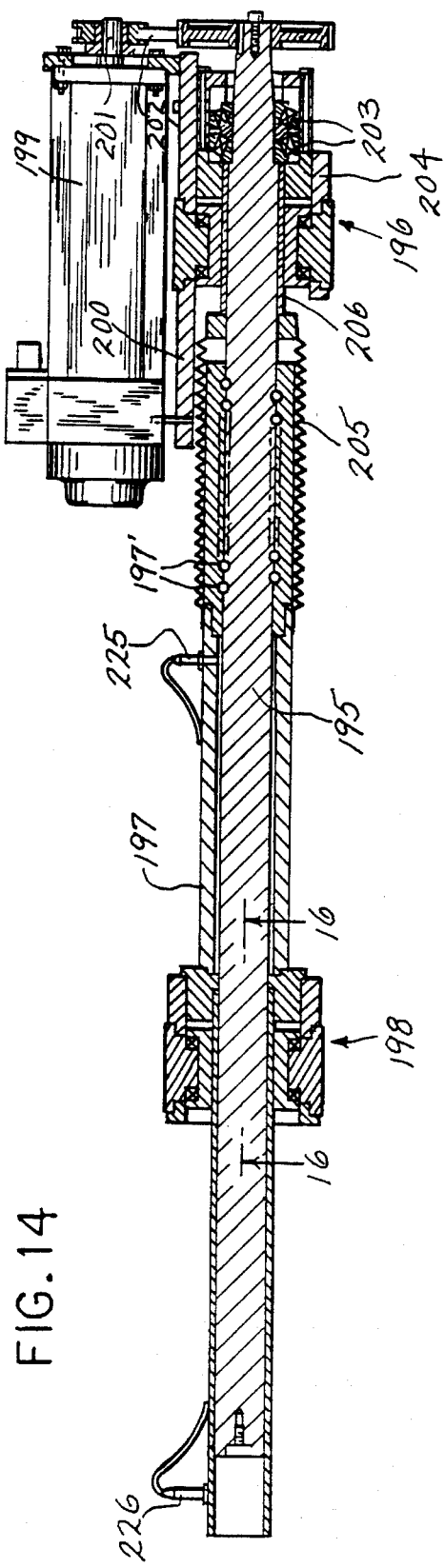
FIG. 14 is a view in longitudinal section of a powered extensible leg usable with the machine tools.

A first proximity switch 225 is mounted in the nut tube 197 near the cage for the balls. A second proximity switch 226 is mounted near the end of the protective tube 212. The proximity switches 225 and 226 are used to halt motion when the ball screw rod 195 reaches the limits of its allowed motion. That is, when the end of the ball screw rod 195 changes the state of the proximity switch 226, the power leg have been shortened to its pre-established limit of travel. The condition showing FIG. 14 is near that short limit of travel. On the other hand, when the end of the ball screw 195 changes the state of the proximity switch 225, the length of the powered leg will have been extended to its maximum desired limit. In both cases, the proximity switches 225 and 226 affect the continued actuation of the motor 199.

One form of instrument arm usable with the machine tools of the present invention, is illustrated in FIGS. 18 and 19. One end of the instrument arm is formed with a solid rod 230 which anchors one end of a first tube 231. The other end of the tube 231 mounts a slide bearing 232 which slides about the outer one of a pair of concentric stationary tubes 233 and 234. The stationary tubes 233 and 234 are each anchored on a rod 235 forming the opposite end of the instrument arm. An outer protective tube 236 is also anchored to the second rod 235 and surrounds the first tube 231. It can be seen, therefore, that the first tube 231 can telescope relative to the stationary tubes 233 and 234 and the protective tube 236.

One end of a scale rod 238 is anchored in the solid rod end 230 of the instrument arm. The opposite end of the scale rod 238 is attached to a piston 239 which slides within the inner stationary tube 234. A read head 240 surrounds the scale rod and is attached to the free end of the inner and outer stationary tubes 233 and 234. The read head 240 is therefore stationary with respect to the fixed end 235 of the instrument arm and the scale rod 238 can move longitudinally within the read head 240 as the instrument arm is extended or contracted. The scale rod 238 and reading head 240 are of known construction and operation. Generally, the read head will sense increments of motion along the scale rod as the two are moved relative to each other and will produce a signal which when amplified is used in a known manner to indicate the relative position and changes in position of the two parts. A usable digital positioning measuring system of scale rod and read head may be that built by Sokki Electronics Corporation and identified as the JS7 series of digital positioning systems.

It is important in the operation of the read head and scale rod that the scale rod be kept taut. To that end, air pressure is introduced to act upon the piston 239 which mounts one end of the scale rod 238. The air under pressure is introduced through a central bore 245 in the fixed end 235 of the instrument arm and the air under pressure travels through the space between the inner and outer tubes 233 and 234 and to and through an opening 246 in the inner tube 234 adjacent its attachment to the read head 240. This introduces pressurized air to the hollow interior of the inner tube 234 in which the piston 239 rides. An orifice passageway 247 extends longitudinally through the read head 240 so that the space between the solid rod 230 of the instrument arm and the read head 240 is connected to the hollow interior a vacuum is not created in that space as the two ends of the instrument arm move relative to each other. The space between the inner and outer stationary tubes 233 and 234 is also used to accommodate firing 248 connecting the read head to the exterior of the instrument arm.

The instrument arm is preferably mounted in a manner similar to that of the powered legs using yoke assemblies. As with the powered legs, to increase the ratio of the maximum to minimum distance between the yoke assemblies, the yoke assemblies are preferably mounted intermediate the ends such as at the locations 249 and 250 identified in FIG. 18.

The movable end 230 of the instrument arm includes a transverse casting 255 having an inlet 256 and an outlet 257 for air under pressure. The inlet and outlet are connected to a central circular raceway 258 in which a ball bearing 259 is disposed. Air under pressure introduced into the casting 255 will cause the ball bearing 259 to roll rapidly along the raceway 258. This will induce an eccentric motion to the end 230 of the instrument arm about the longitudinal axis of the arm. This eccentric motion is useful to insure that the telescoping elements of the instrument arm can slide smoothly with respect to each other. At the same time, the vibratory motion induced by the spinning ball bearing 259 is in a direction transverse to the direction of motion being measured and therefore does not significantly affect that measurement.

FIG. 20 illustrates a form of instrument arm which uses a laser interferometer. The instrument arm is formed of concentric inner and outer tubes 260 and 261, respectively, that slide past each other on bearings 262 which preferably are made of a polytetraflouride material. A bellows 263 connects the end of the outer tube 261 to the outside of the inner tube 260 so as to close off the volume within the tubes and prevent contamination through the bearings 262. A laser beam from a laser light source 264 enters the hollow interior of the instrument leg through a window 265 and is reflected off a mirror 266 into an interferometer 267 where it is divided into two components. One component exits the interferometer and travels inside of the tubes to a retro-reflector 268 which is mounted at the closed end of the outer tube 261. Light is reflected back down the tubes towards the interferometer 267. The two light beam components are recombined within the interferometer 267 and the combined components interfere with each either constructively or destructively depending on their phase. A photo detector within the laser source 264 detects the fringes that result from the interferences between the two components of the light beam as the retro-reflector 268 moves relative to the interferometer. The phase is dependent upon the distance between the interferometer 267 and the retro-reflector 268 and the fringes are therefore indicative of changes in length of the instrument arm.

The number of light waves in transit between the interferometer 267 and the retro-reflector 268 depends not only on the distance between the two but also on the speed of light. The speed of light in air is dependent upon the atmospheric pressure, temperature and humidity. Pressure and temperature have the largest effect and therefore they must be known if the distance between the interferometer and retro-reflector is to be calculated based on the number of fringes. The air within the interior of the instrument arm is vented to a collapsible bladder 270. As the instrument arm expands, it displaces air that is stored within the bladder 270. The bladder 270 is limp at all times so that the pressure within the arm is equal to the ambient pressure outside of the arm. A single pressure transducer can then be used for all of the instrument arms to determine the pressure of the air through which the light beam is passing.

A temperature measurement transducer 271 senses the internal temperature in each instrument arm since the temperature may be localized. The effect of humidity is negligible and is ignored.

Instead of an instrument arm that has a structural integrity, it is possible to use known forms of position transducers to measure the distance between the platforms. An example of a usable position transducer is the cable actuated displacement transducers available from Houston Scientific International, Inc. and identified as the 1850 Series. In using such a transducer, a cable would be connected to one of the platforms and the transducer housing to the other platform. A potentiometer within the housing would provide a signal indicative of the length of cable extending from the housing at any particular position of the machine tool components.

A combination of measurements using the power legs and instrument arms can also be used to speed up positioning of the components of the machines. For example, the powered legs could be provided with a linear scale (such as in FIG. 8) or a rotary resolver or shaft encoder (such as in FIG. 9) to provide a position feedback signal that allows a gross positioning of the platforms relative to each other. An associated instrument arm could then be used for fine positioning with the powered legs being moved at a slower rate to the final desired position.

The angles that the powered legs make with the platforms will effect the stiffness of the machine and the accuracy of the positioning of the tool relative to the workpiece. The optimum position of the legs relative to the platforms for achieving optimum vertical and horizontal stiffness would be about 35°. This assumes that each platform exhibits stiffness along its orthagonal axes. For achieving the best vertical and horizontal resolutions to achieve accuracy, at nominal positions the optimum angle of the legs relative to the platforms is about 41°.

The typical part program for a machine tool is designed to provide blocks of instruction concerning the X,Y,Z,A,B,C coordinates of the tool tip and workpiece relative to each other. Because the six legs of a machine tool in accordance with the present invention do not align themselves with the normal orthagonal coordinates, a method must be developed to relate the normal coordinate block instructions to the length of the six legs. The following method has been developed for that purpose. The steps are arranged in logic sequence form and can be summarized as follows:

I. Initializing present machine X,Y,Z,A,B,C coordinates
II. For each of six legs:
   A. Initialize top and bottom pivot vector coordinates.
   B. Calculate and initialize present leg length.
   C. Define X,Y,Z,A,B,C home position for present leg length.
III. Set sub-block time (typically 0.02 seconds) sufficiently short to achieve desired linearity and precision of movement.
IV. For each part program:
   A. For each block:
     1. From the part program read machine coordinates of destination; X,Y,Z,A,B,C and feed rate
     2. Using feed rate and sub-block time, compute the number of sub-blocks required to reach block destination.
     3. For each sub-block:
       (a) For each of six coordinates:
       1. Present value=ending value of previous sub-block.
       2. Ending value=(destination value minus present value) divided by number of sub-blocks remaining plus present value.
       (b) Using the ending value of the six coordinates, compose a sub-block ending vector
       (c) For each leg:
       1. Rotate the top pivot vector to the ending angles for the current sub-block.
       2. Add a sub-block ending vector to the result.
       3. Subtract the bottom pivot vector from the result.
       4. Calculate the ending leg length by extracting the square root of the sum of the squares of the coordinates of the result of step (c) 3.
       5. Convert the ending leg length to the nearest integral servo position command count.
       6. Send the position count to a servo command buffer.
       7. Calculate the leg velocity required to reach new leg length in one sub-block time.
       8. Convert the leg velocity to the nearest integral servo command count.
       9. Send velocity count to the servo command buffer.
       (d) Send sub-block start command simultaneously to all leg servos.
   B. A block is completed when no sub-blocks remain.
V. The task is completed when no blocks remain in the part program.

Initializing the present machine is a process which is known in the machine tool art as gridding. It establishes a home position in which the tip of the tool and the center of the workpiece cube are coincident.

Figure 21:
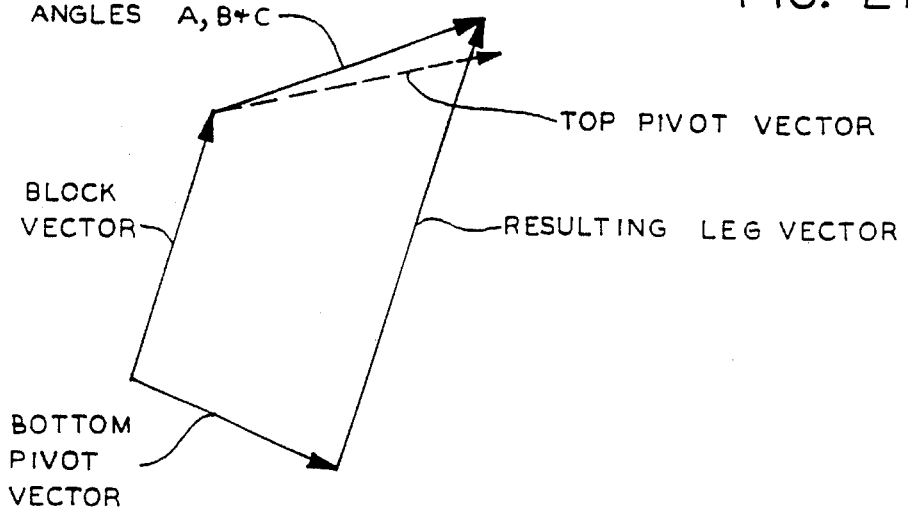
FIG. 21 is a vector diagram illustrating a method for determining position commands for the legs of the machine tools.

A top pivot vector is the vector of the tool tip relative to a top pivot point for a particular leg. A bottom pivot vector is the vector of the center of the workpiece cube relative to a bottom pivot for a particular leg. The top pivot vectors remain at a fixed length but can rotate through the A,B,C coordinates. FIG. 21 is a vector diagram that illustrates the relationship of a block vector and the resulting leg vector which must be provided to achieve the instructed block vector. It should be understood that all of the vectors have three dimensions, even though they are illustrated in only two dimensions in FIG. 21.

Note that not only is the length of the leg vector important, the rate of movement of the legs is very important because controlling the rate of movement allows for contouring.

Although the invention has been described in relation to machine tools, it is also the usable in connection with any machine that requires that an operator be brought into position with respect to an object. It is also useful for a wide variety of tools other than the traditional cutting tool.

We claim:

1. A pivotable joint, comprising:

a central block;

a first yoke pivotably connected to the central block for pivotable motion about a first axis; and a second yoke pivotably connected to the central block for pivotable motion about a second axis, wherein the central block includes an opening having a cross-sectional area and extending therethrough between a first surface and a second surface, the cross-sectional area of the opening decreasing from the first surface and the second surface towards a region located between the first surface and the second surface, wherein the opening is oblong at the first surface and the second surface.

2. The pivotable joint as recited in claim 1, wherein the opening is defined by an exterior wall having arcuate surfaces and flat surfaces.

3. The pivotable joint as recited in claim 2, further including a first pair of bearings on which the first yoke is mounted to the central block and a second pair of bearings on which the second yoke is mounted to the central block.

4. The pivotable joint as recited in claim 3, wherein the central block includes a bearing recess for receiving at least one of the bearings.

5. The pivotable joint as recited in claim 3, wherein the central block includes two pairs of bearing recesses for receiving the first and second pairs of bearings.

6. The pivotable joint as recited in claim 3, wherein the first and second yokes include recesses for receiving the first and second pairs of bearings, respectively.

7. A gimbal assembly, comprising:

an extensible member including a rigid outer housing, a rod configured to move therethrough, and a mechanism to move the outer housing with respect to the rod;

a center member having a hole configured to receive the rod therethrough;

a first mounting member rigidly connected to the outer housing and pivotably connected to the center member for pivotable motion about a first axis; and a second mounting member pivotably connected to the center member for pivotable motion about a second axis, wherein the hole is configured to allow pivotable motion of the rod about the first axis while the center member remains rotationally stationary with respect to the first axis.

8. The gimbal assembly as recited in claim 7, wherein the first mounting member includes a pair of side arms disposed to receive the center member therebetween.

9. The gimbal assembly as recited in claim 8, wherein the second mounting member includes a pair of side arms disposed to receive the center member therebetween.

10. The gimbal assembly as recited in claim 9, wherein the first and second mounting members are connected to the center member by a plurality of bearings.

11. The gimbal assembly as recited in claim 10, wherein the center member includes a plurality of bearing recesses for receiving the plurality of bearings.

12. The gimbal assembly as recited in claim 7, wherein the hole has a cross-sectional area and extends between a first surface and a second surface of the center member, the cross-sectional area of the hole decreasing towards a central region disposed approximately midway between the first surface and the second surface.

13. The gimbal assembly as recited in claim 12, wherein the hole is defined by a wall having arcuate surfaces and flat surfaces.

14. The gimbal assembly as recited in claim 12, wherein the shape of the hole is oblong at both the first surface and the second surface.

15. The gimbal assembly as recited in claim 14, wherein the first surface and the second surface are flat surfaces.

16. A pivotable joint assembly configured for connection between two machine components, at least one of which is movable, the pivotable joint assembly comprising:

an extensible leg member including a rod, a stationary platform connected to the rod, a movable outer housing configured to fit about the rod and to move in an axial direction along the rod, and a mechanism to move the outer housing with respect to the rod;

a first pivotable joint including a center member having a hole configured to receive the rod therethrough;

a first mounting member rigidly connected to the movable outer housing and pivotably connected to the center member for pivotable motion about a first axis;

a second mounting member pivotably connected to the center member for pivotable motion about a second axis, wherein the hole is configured to allow pivotable motion of the rod about the first axis while the center member remains rotationally stationary with respect to the first axis; and a second pivotable joint connected to the stationary platform.

17. The pivotable joint assembly as recited in claim 16, wherein the hole has a cross-sectional area and extends between a first surface and a second surface of the center member, the cross-sectional area of the hole decreasing towards a central region disposed approximately midway between the first surface and the second surface.

18. The pivotable joint assembly as recited in claim 17, wherein the hole is defined by a wall having arcuate surfaces and flat surfaces.

19. The pivotable joint assembly as recited in claim 18, wherein the shape of the hole is oblong at both the first surface and the second surface.

20. The pivotable joint assembly as recited in claim 19, wherein the extensible leg member comprises a ball screw.

* * * * *